(12) United States Patent
Reilly et al.

(10) Patent No.: US 10,149,023 B2
(45) Date of Patent: *Dec. 4, 2018

(54) SYSTEM PROVIDING SPONSORED CONTENT

(71) Applicant: Google Technology Holdings LLC, Mountain View, CA (US)

(72) Inventors: Craig P. Reilly, Bartlett, IL (US); Robert H. Yacobellis, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,522

(22) Filed: Jan. 11, 2018

(65) Prior Publication Data

US 2018/0139513 A1 May 17, 2018

Related U.S. Application Data

(63) Continuation of application No. 14/505,746, filed on Oct. 3, 2014, now Pat. No. 9,900,666, which is a continuation of application No. 12/608,729, filed on Oct. 29, 2009, now Pat. No. 8,863,167.

(51) Int. Cl.
| | |
|---|---|
| *H04N 21/235* | (2011.01) |
| *H04N 21/236* | (2011.01) |
| *H04N 21/239* | (2011.01) |
| *H04N 21/254* | (2011.01) |
| *H04N 21/258* | (2011.01) |
| *H04N 21/431* | (2011.01) |
| *H04N 21/81* | (2011.01) |
| *H04N 7/173* | (2011.01) |
| *H04N 21/472* | (2011.01) |
| *H04N 21/845* | (2011.01) |
| *H04N 21/478* | (2011.01) |

(52) U.S. Cl.
CPC ....... *H04N 21/812* (2013.01); *H04N 7/17318* (2013.01); *H04N 21/472* (2013.01); *H04N 21/47815* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 6,553,336 B1 * | 4/2003 | Johnson | G01D 3/022 702/188 |
| 6,898,571 B1 | 5/2005 | Val et al. | |
| 6,915,271 B1 | 7/2005 | Meyer et al. | |
| 7,107,236 B2 | 9/2006 | Lei | |

(Continued)

*Primary Examiner* — Brian T Pendleton
*Assistant Examiner* — Jean Duclos Saintcyr
(74) *Attorney, Agent, or Firm* — Fish & Richardson P.C.

(57) ABSTRACT

A system receives an indication of selection of an item in a broadcast segment from an end device. A broadcast segment is identified by the selection and a broadcast segment schedule. An item ID is determined using the identified broadcast segment and the broadcast segment schedule, and a corresponding sponsor of the item is determined using the item ID and the identified broadcast segment. An anonymized message, including the item ID and a request for information, is sent to the corresponding sponsor. A reply is received from the corresponding sponsor, and forwarded to an end user contact.

15 Claims, 6 Drawing Sheets

(56) References Cited

U.S. PATENT DOCUMENTS

| | | |
|---|---|---|
| 7,206,820 B1 | 4/2007 | Rhoads et al. |
| 7,213,254 B2 | 5/2007 | Koplar et al. |
| 7,231,357 B1 | 6/2007 | Shanman et al. |
| 2004/0098625 A1 | 5/2004 | Lagadec et al. |
| 2006/0116117 A1* | 6/2006 | Takase ................ H04L 63/0407 455/420 |
| 2007/0079326 A1 | 4/2007 | Datta et al. |
| 2007/0220545 A1* | 9/2007 | Awano .................. H04H 20/28 725/34 |
| 2009/0270102 A1* | 10/2009 | Liu ....................... H04W 36/36 455/436 |
| 2010/0081437 A1 | 4/2010 | Beckmann et al. |
| 2010/0094727 A1* | 4/2010 | Shapiro ................ G06Q 20/12 705/26.1 |
| 2013/0041974 A1 | 2/2013 | Luna et al. |

\* cited by examiner

| TIME 202 | SEGMENT ID 204 | ITEM ID 206 | SPONSOR ID 208 |
|---|---|---|---|
| T1 | SEG 1 | IID 1 | SID 1 |
| T2 | SEG 2 | IID 2 | SID 2 |
| T3 | SEG 3 | IID 3 | SID 3 |
| ⋮ | ⋮ | ⋮ | ⋮ |
| TN | SEG N | IID N | SID N |

SYSTEM PROVIDING SPONSORED CONTENT

CROSS-REFERENCE TO RELATED APPLICATION

This application is a continuation application of, and claims priority to, U.S. patent application Ser. No. 14/505,746, titled "System Providing Sponsored Content," filed on Oct. 3, 2014, which is a continuation application of, and claims priority to, U.S. patent application Ser. No. 12/608,729, now U.S. Pat. No. 8,863,167, titled "System Providing Sponsored Content," filed on Oct. 29, 2009. The disclosure of the foregoing applications are incorporated herein by reference in their entirety for all purposes.

BACKGROUND

Consumers receive a diverse array of advertising across a variety of media. However, it is often not convenient for consumers to access information on products when an advertising opportunity piques their interests. Similarly, advertisers or companies providing the advertised products like to provide as much product information as possible in a fast and easy manner if a consumer expresses interest in the products.

Currently, consumers are known to access information on a desired item viewed over broadcast media, such as TV programs, media broadcasted over the Internet, etc., by noting the item for later research. For example, a TV program may indicate that the consumer can go to a particular website to get more information on products used. The consumer is forced to write down or otherwise remember an item of interest or a Uniform Resource Locator (URL), and then access the information via the Internet. There are often occasions where the consumer declines to follow through on initial interest because of the steps required in accessing information on the item of interest, or the consumer does not have time or interest to perform all steps necessary to get information on the item of interest. In these situations, there may be missed opportunities on the part of both sellers of the products trying to maximize sales as well as consumers potentially looking to purchase products.

SUMMARY

Disclosed herein is a method for providing sponsored content using a system, according to an embodiment. In the method, the system receives an indication of selection of an item in one of a plurality of broadcast segments from an end device. A broadcast segment is identified using a broadcast segment schedule and the indication of selection. The broadcast segment schedule contains a plurality of broadcast segments. Each broadcast segment has a broadcast channel and a time of broadcast, an item identification (ID) corresponding to an item in each broadcast segment, and a sponsor ID having a corresponding sponsor for each item ID. An item ID is identified using the identified broadcast segment schedule and the indication of selection. A corresponding sponsor is identified by using the indication of selection and the broadcast segment schedule. In addition, an anonymized message is generated. The anonymized message includes a request for information based on the indication of selection and the item ID. The anonymized message also conceals the identity of the end user of the end device to the corresponding sponsor and maintains validity for reply to the end user for a limited time. Further, the anonymized message is sent to the corresponding sponsor. A reply is received from the corresponding sponsor and the reply is forwarded to an end user contact.

Also disclosed herein is a system configured to provide sponsored content to an end device, according to an embodiment. The system includes a data storage device. A broadcast segment schedule is stored in the data storage device. The broadcast segment schedule contains a plurality of broadcast segments, each broadcast segment having a broadcast channel and a time of broadcast, an ID corresponding to an item in each broadcast segment, and a sponsor ID identifying a corresponding sponsor for each item ID. The system also includes an input/output module configured to receive an indication of selection of an item in one of the plurality of broadcast segments from the end device. Additionally, the system includes a segment sponsor module configured to identify the broadcast segment using the indication of selection of the item and the broadcast segment schedule. The segment sponsor module is also configured to identify an item ID of the item using the identified broadcast segment and the broadcast segment schedule. Further, the segment sponsor module is configured to identify a corresponding sponsor of the item using the item ID and the identified broadcast segment. The system also has a messaging module configured to generate an anonymized message. The anonymized message includes the item ID, conceals the identity of the end user of the end device to the corresponding sponsor, and maintains validity for a reply to the end user for a limited time. The input/output module is also configured to send the anonymized message to the corresponding sponsor, to receive a reply from the corresponding sponsor and to forward the reply from the corresponding sponsor to an end user contact.

Still further disclosed is a computer readable storage medium on which is embedded one or more computer programs implementing the above-disclosed method of providing sponsored content using the system, according to an embodiment.

Embodiments of the present invention provide a system configured to provide sponsored content to an end device from at least one sponsor. For example, embodiments of the present invention provide for selecting an item from an end device, sending a request to the system, having the system anonymize the message and send the message to a corresponding sponsor, and receiving a forwarded reply from the corresponding sponsor.

The embodiments enable an end user to quickly and easily obtain information from a sponsor by selecting a broadcast segment in a broadcasted program. For instance, the embodiments may enable an end user to receive a recipe and/or coupons from a cooking show by pressing a button on a remote control at an appropriate point in the show (as opposed to writing down and visiting a uniform resource locator (URL) at a later time). In addition, the access is anonymous and protected, relieving privacy concerns the end user may have.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Definitions

The term "end device," as used herein, refers to a device that may be used to receive and interact with a broadcast program. Accordingly, the end device may comprise a television set, having a set top box and a remote with which the end user may select an item. Alternately, the end device may comprise a cell phone.

The term "broadcast program," as used herein, refers to a program that is broadcast from a broadcast source. The broadcast source may include terrestrial broadcast, cable, satellite or Internet protocol television (IPTV).

The term "broadcast segment," as used herein, refers to a segment of a broadcast program that is defined by a time period and a broadcast channel. For instance, the broadcast segment may be a 30 second segment of a broadcast program or an advertisement. Additionally, the broadcast segment may be defined by screen location.

The term "indication of selection of an item," as used herein, refers to a signal that an item has been selected by an end user for further information. The indication of selection includes an indication of the broadcast channel, an identification of the end device and/or user and a timestamp of the selection. The indication of selection may also include a screen location. Further, the indication of selection may also include a location of the end device. For example, the location of the end device may be an end device network, which is a network or sub-network that the end device is connected. The identification of the end device network is optional and may be used if a server serves multiple end device networks.

The term "item identification (ID)," as used herein, refers to a character or characters with which an item is identified. The item ID may be, for instance, an alphanumeric character.

The term "broadcast segment schedule," as used herein, refers to schedule of all broadcast segments that may be used with the indication of selection by the system to determine an item and a corresponding sponsor for the item.

The term "sponsor," as used herein, refers to an entity that provides content to an end user based upon an item identified by the indication of selection.

The term "corresponding sponsor," as used herein, refers to a sponsor corresponding to a particular item.

The term "sponsored content," as used herein, refers to an item that may be selected and has a corresponding sponsor. For instance, the sponsored content may be a commercial article such as a saleable household item. The sponsored content may also be an informational item such as public service information regarding recycling.

The term "request for information," as used herein, refers to a request for information regarding an item identified in the indication of selection sent from an end user to a corresponding sponsor of the item.

The term "end user contact," as used herein, refers to an address at which an end user may be contacted. For instance, the end user contact may be an email address.

The term "anonymize," as used herein, refers to removing all information identifying the end user from a message, such that a recipient of the message is unable to determine the end user.

Figure 1:
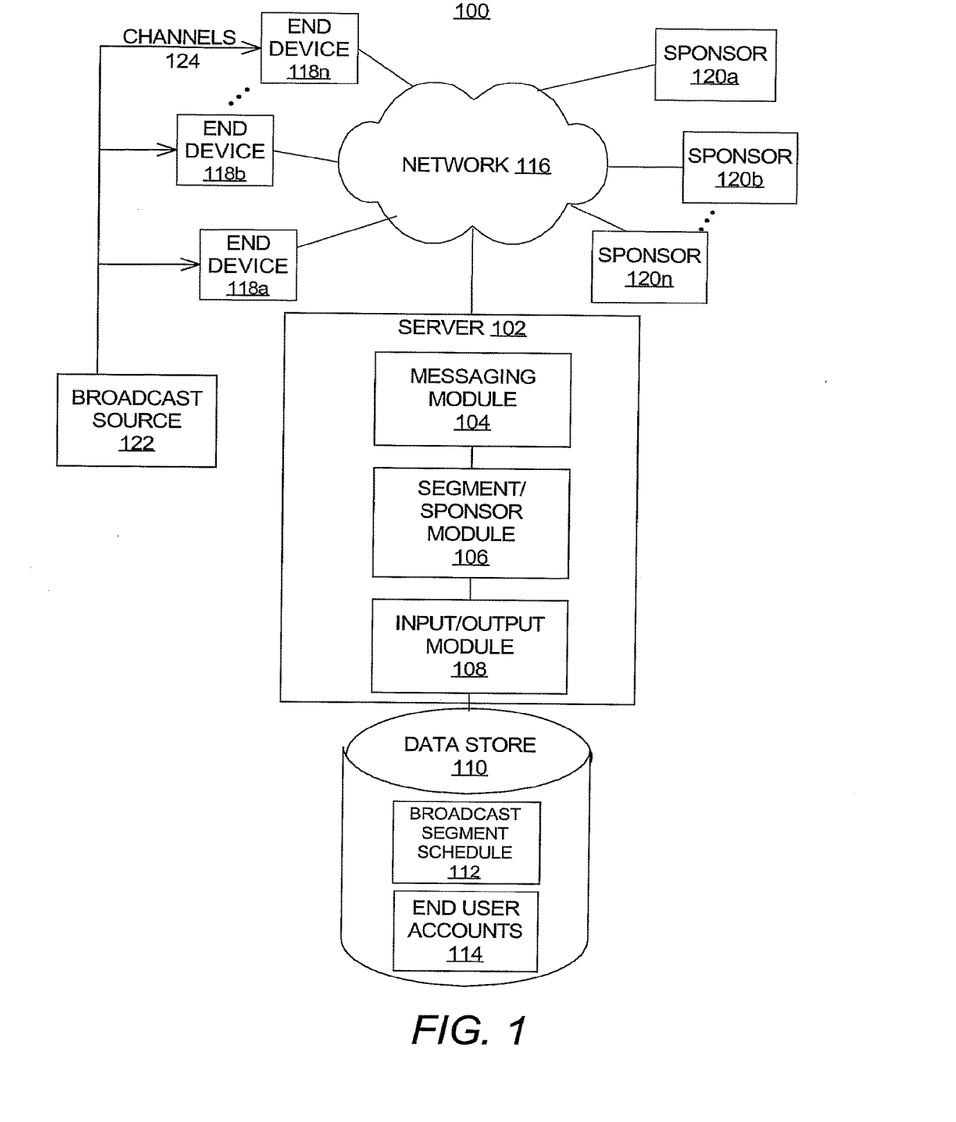
FIG. 1 illustrates a simplified block diagram of a system configured to provide sponsored content using a system, according to an embodiment of the invention.

FIG. 1 illustrates a simplified block diagram of a system including a server 102 configured to communicate to a plurality of end devices 118a-n, and to communicate to a plurality of sponsors 120a-n, according to an embodiment of the invention. It should be understood that the system 100 depicted in FIG. 1 may include additional components and that some of the components described herein may be removed and/or modified without departing from a scope of the system 100.

As depicted in FIG. 1, the server 102 includes a messaging module 104, a segment sponsor module 106 and an input/output module 108. The input/output module 108 may include a hardware interface (not shown) through which the server 102 is connected to a network 116. The server 102 is connected to a data store 110 through the network 116. The modules 104-108 may comprise software modules, hardware modules, or a combination of software and hardware modules. Thus, in one embodiment, one or more of the modules 104-108 comprise circuit components. In another embodiment, one or more of the modules 104-108 comprise software code stored on a computer readable storage medium, which is executable by a processor.

A broadcast segment schedule 112 is stored in the data store 110. The broadcast segment schedule 112 provides information on broadcast programs scheduled to be broadcast from a broadcast source 122 to a plurality of end devices 118a-n that are connected to the network 116. Additionally, the broadcast segment schedule 112 contains information with respect to sponsored content in the broadcast program as described in detail herein below with respect to FIG. 2.

The network 116 may comprise a hybrid fiber coaxial cable network. Alternately, the network 116 may comprise an access network connected to an internet protocol (IP) address. The network 116 allows the server 102 to communicate with the end devices 118a-n and the sponsors 120a-n. The network connecting the server 102 with the end devices 118a-n may be an independent network from the network connecting the server 102 with the sponsors 120a-n (not shown). If independent networks are used, the server 102 supports independent interfaces to each network.

Each of a plurality of end user accounts 114a-n stored in the data store may correlate to at least one of the plurality of end devices 118a-n and may contain information submitted by the end user to an operator of the system 100, for instance a cable multisystem operator (MSO), including an end user contact. For instance, the end user contact may comprise an email address or telephone number by which the end user may be directly contacted. The end user account 114a-n may also contain billing information for the end user. The information contained in the end user account 114a-n may be information the end user desires to restrict access by entities such as the plurality of sponsors 120a-n.

Each of the plurality of end devices 118a-n is a device configured to view and interact with multimedia content by tuning to one of a plurality of broadcast channels 124a-n received from the broadcast source 122. Additionally each of the end devices 118a-n is configured to interact with the server 102. The end devices 118a-n may interact with the server 102 using unicast channels. Alternately, the end devices 118a-n may use any of an Internet Protocol (IP) backchannel, an integrated cable modem, and an Ethernet cable. Accordingly, each of the plurality of end devices 118a-n may comprise a television set, having a set top box and a remote with which the end user may select items as described hereinbelow with respect to the methods 400-500 depicted in FIGS. 4-5. Alternately, the end device 118a-n may comprise a single device such as a handheld device connected to an MSO, for instance a cell phone. Note that each of the end devices 118a-n may comprise any other device configured to perform the methods 400-500 depicted in FIGS. 4-5. Each of the plurality of broadcast channels 124a-n is listed in the broadcast segment schedule 112 along with broadcast segments scheduled to be broadcast on each of the plurality of broadcast channels 124a-n to the plurality of end devices 118a-n.

Figure 2:
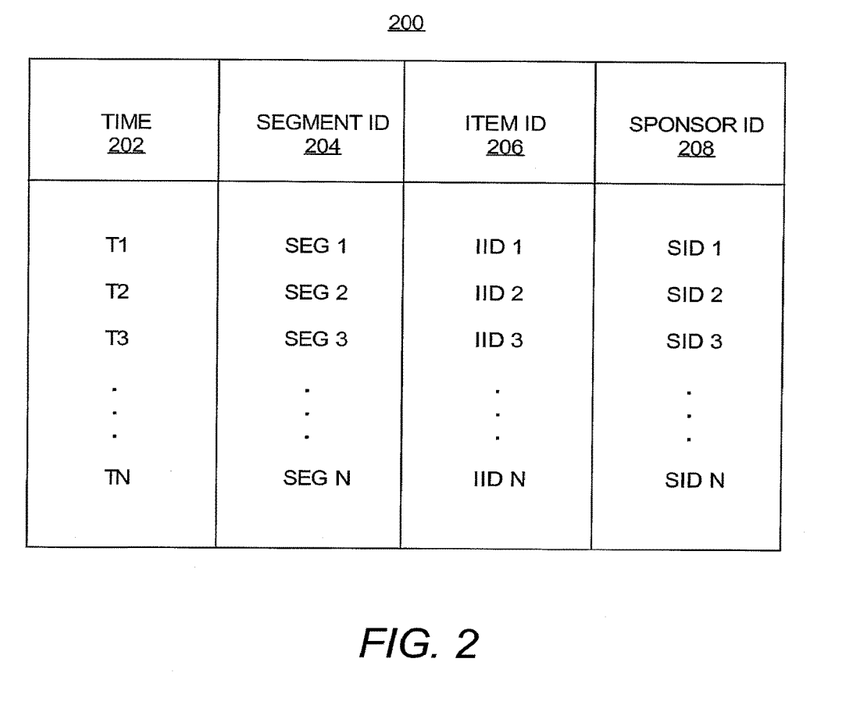
FIG. 2 illustrates a simplified block diagram of a broadcast segment schedule, according to an embodiment of the invention.

As depicted in FIG. 2, the broadcast segment schedule 112 comprises a table containing a time T 202a-n, a segment ID 204a-n, an item ID 206a-n, and a sponsor ID 208a-n. The time T 202a-n corresponds to the time at which each program is broadcast from the broadcast source 122 (shown in FIG. 1). The segment ID 204a-n corresponds to broadcast segments scheduled to be broadcast at the corresponding time T 202a-n. The segment ID 204 is produced using an algorithm from a channel ID (not shown) correlating to each broadcast channel and, optionally, the screen location. The algorithm may also include the time indication in the broadcast segment or the time indication may be its own key defined as time T 202a-n in Table 200 as shown. The item ID 206a-n corresponds to an item contained within the broadcast segment. A same item may appear in multiple different broadcast segments, for instance in the Table 200 item IID 1 appears in broadcast segment SEG 1 and broadcast segment SEG 3. The sponsor ID 208a-n corresponds to a sponsor of the item 206a-n. A same sponsor may correspond to multiple different items. By using an indication of selection to identify an item (sponsored content) in a broadcast program about which the end user desires to receive information from one of the sponsors 120a-n, the system 100 enables the end user to receive information in real time from the sponsors 120a-n as described in detail with respect to FIGS. 3A-B.

Figure 3A:
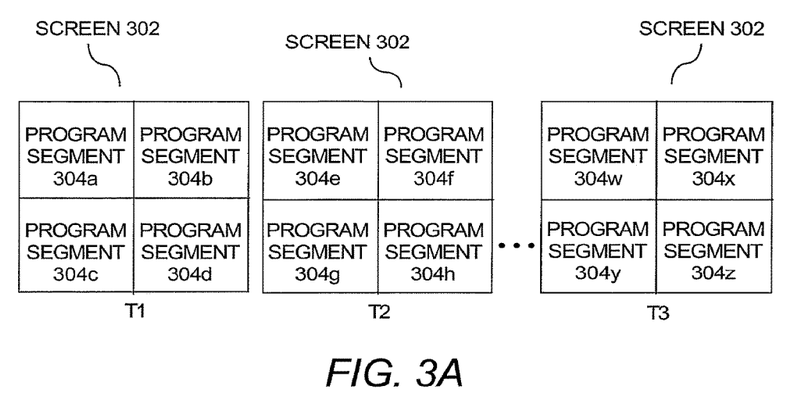
FIG. 3A illustrates a screen of an end device, according to an embodiment of the invention.

As depicted in FIG. 3A, each of the plurality of end devices 118a-n may have a screen 302 on which the broadcast segments 304a-n may be displayed. The broadcast segments 304a-n viewed by the end user may be sponsored by at least one of a plurality of sponsors 120a-n, also connected to the network 114. The broadcast segments 304a-n may be divided into segments defined by a broadcast channel and a time of broadcast from the broadcast source 122. For example, the broadcast segment 304a-n may comprise 30 seconds of a particular program on a particular channel, beginning at a particular time of broadcast from the broadcast source 122 for each of the broadcast segments 304a-n. The broadcast segment 304a-n may be sponsored by at least one of a plurality of sponsors 120a-n and corresponds to one of the segment IDs 204a-n.

Alternately, the broadcast segments 304a-n may be divided into segments defined by the time and the channel of broadcast from the broadcast source 122 and a location of the item in the screen 302 at the time of selection as shown in FIG. 3A. The screen 302 may be divided into zones, with each zone representing a separate broadcast segment 304a-n. Each of the broadcast segments 304a-n corresponds to a separate segment ID 204a-n. The number of broadcast segments 304a-n at a particular time of broadcast from the broadcast source 122 may comprise multiples of a predetermined number, where the predetermined number denotes zones of the screen 302. The broadcast segment schedule 112 in this instance is configured to support a screen 302 having items selectable by providing both the time and location of sponsored content in the indication of selection of the item.

Each of the end devices 118a-n is configured so that an end user may request information on an item in one of the broadcast segments 304a-n. The end user may request the information based on a visual cue on the screen 302 or based on a sound track of the broadcast segment 304a-n (for instance, a recording stating "respond now to receive further information on this product"). The broadcast segment 304a-n may comprise a television show, an advertisement, or a sub-screen provided by the cable operator. The end user may indicate the item by clicking on a particular button on the end device 118a-n, generating an indication of selection of the item. The indication of selection of the item includes an indication of a broadcast channel and a time stamp. Additionally, the indication of the selection of the item may include the screen location of the item. The end device then transfers the indication of selection of the item to the input/output module 108 of the server 102. The input/output module 108 comprises an interface with the end devices 118a-n through the network 116.

The input/output module 108 thereafter receives the indication of selection. The input/output module 108 is configured to transfer the indication of selection to the segment sponsor module 106. The segment sponsor module 106 is configured to retrieve the broadcast schedule 112 from the data store 110 upon receiving the indication of selection of the item. The broadcast schedule 112 contains program segments 304a-n of each program broadcast by the broadcast source 122 to the plurality of end devices 118a-n. The segment sponsor module 106 uses the indication of the selection of the item in order to identify a particular segment ID 204a-n in the broadcast segment schedule 112 corresponding to one of the broadcast segments 304a-n. Each of the broadcast segments 304a-n corresponds to one of the item IDs 206a-n and a corresponding sponsor ID 208a-n having a corresponding sponsor.

According to an embodiment, the segment sponsor module 106 is configured to use the indication of selection of the item to determine a corresponding time T 202a-n in the broadcast segment schedule 112 for one of the broadcast segments 304a-n. The indication of selection of the item in the broadcast segment 304a-n in this instance may include the broadcast channel, and a time stamp denoting the time of selection of items in the broadcast segment schedule 112. Subsequently, the segment sponsor module 106 may determine the corresponding sponsor by using the item ID and the identified broadcast segment. According to another embodiment, the segment sponsor module 106 is configured to use the indication of selection to determine multiple sponsors 120*a-n* where multiple sponsor IDs 208*a-n* correspond to a particular of the items 206*a-n*. For instance, a broadcast segment 304*a-n* may correspond to multiple sponsors IDs 208*a-n* where a request for information on a same item may be sent to multiple sponsors 120*a-n*.

According to another embodiment, where items may be selected in the screen 302 of the end device 118*a-n* by location, the indication of selection of the item is configured to transfer information regarding the zone of the screen 302 within which the item is located. This information is transferred in addition to the time of broadcast from the broadcast source 122. For example, the end device 118*a-n* may transfer vectors in order to convey the zone of the screen 302 from which the end user may have selected an item and a time stamp to convey the time of broadcast of the broadcast segment containing the selected item.

Figure 3B:
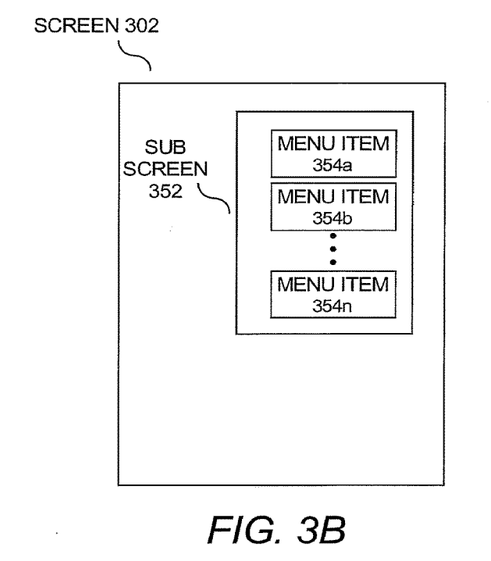
FIG. 3B illustrates a screen of an end device, according to another embodiment of the invention.

In an alternate embodiment of the end device 118*a-n*, as depicted in FIG. 3B, the screen 302' may contain a sub-screen 352 on which menu items 354*a-n* may be displayed and selected. The end user may scroll through the menu items 354*a-n* in order to select a particular of the menu items 354*a-n*. The particular menu item may correlate to a single program segment. Each of the program segments 304*a-n* may be sponsored by at least one of the plurality of sponsors 120*a-n*, also connected to the network 114. The segment IDs 204*a-n* in the broadcast segment schedule 112 are configured to correspond to menu items 354*a-n* at a particular time of broadcast from the broadcast source 122. For menu items in the sub-screen 352, the indication of selection of the item may be used to transfer information to the server 102.

The segment sponsor module 106 may thereafter transfer information identifying the item ID, a corresponding sponsor and the request for information conveyed with the indication of selection of the item to the messaging module 104. The corresponding sponsor is one of the sponsors 120*a-n* having a sponsor ID corresponding to the item ID. The messaging module 104 is configured to prepare and send an anonymized message to the corresponding sponsor regarding the item.

According to an embodiment, the messaging module 104 is configured to remove identifying information regarding the end user from the indication of selection of the item while preparing a message to the corresponding sponsor containing the request for information. The messaging module 104 thereafter assigns an anonymous temporary address to the message before transferring the message to the input/output module 108. The sponsor 120*a-n* may reply to the request for information at the anonymous temporary address. For instance, the messaging module 104 may assign a temporary email address through which correspondence between the corresponding sponsor and the end user may be routed. By placing a time limit on the validity of the anonymous email address, the messaging module 104 decreases the opportunity for unsolicited email (for instance SPAM). The input/output module 108 may thereafter send the message to the corresponding sponsor. The request for information contains the item ID that helps the corresponding sponsor determine the appropriate context of a request and respond with material/information corresponding to the request.

If the corresponding sponsor responds to the anonymous temporary address, the input/output module 108 may forward the response from the corresponding sponsor to an end user contact specified in the end user account 114*a-n*.

According to an embodiment, when the anonymous temporary address expires, messages from the corresponding sponsor will no longer be forwarded to the end user contact. Further, the messaging module 104 may limit the number of reply messages forwarded from the corresponding sponsor to the end user contact during the active period of the anonymous temporary address.

It will be apparent that the system 100 may include additional elements not shown and that some of the elements described herein may be removed, substituted and/or modified without departing from the scope of the system 100. It should also be apparent that one or more of the elements described in the embodiment of FIG. 1 may be optional.

An example of a method in which the system 100 may be employed for providing sponsored content now be described with respect to the following flow diagram of the methods 400-500 depicted in FIGS. 4-5. It should be apparent to those of ordinary skill in the art that the methods 400-500 represent a generalized illustration and that other steps may be added or existing steps may be removed, modified or rearranged without departing from the scopes of the methods 400-500. Also, the methods 400-500 are described with respect to the system 100 by way of example and not limitation, and the methods 400-500 may be used in other systems.

Some or all of the operations set forth in the method 300 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

At step 402, an input/output module 108 of the server 102 receives an indication of selection of an item. According to an embodiment, the input/output module 108 receives the indication of selection of the item from an end device 118*a-n* viewing a broadcast program in which the broadcast segments 304*a-n* are based upon the particular time of broadcast from the broadcast source 122. The indication of selection of the item may comprise a broadcast channel and a time stamp. The time stamp indicates the time of selection of the item. In an alternate embodiment of the step 402, the input/output module 108 receives the indication of selection of the item where the end device 118*a-n* is configured to select an item by location in a screen 302 and the time of selection in the broadcast program. Accordingly, the indication of selection of the item may include a broadcast channel, a time stamp and information regarding a zone of the screen 302 within which the item is located. For instance, information regarding the zone of the screen 302 may be transferred in the indication of selection by a vector or vectors denoting the location of the item in the screen 302. In another embodiment, the input/output module 108 receives the indication of selection of the item from an end device 118*a-n* viewing a broadcast program in a sub-screen 352 with menu items 354 is located. The indication of selection in this instance is based on a menu item ID of the menu item 354 at a particular time of broadcast from the broadcast source 122.

At step 404, the segment sponsor module 106 identifies the broadcast segment using the indication of selection of the item and a broadcast segment schedule 112, retrieved from a data store 110. For instance, the segment sponsor module 106 may use the broadcast channel and time stamp given in the indication of selection of the item 206 to determine the segment ID 204a-n corresponding to a broadcast channel and time T 202a-n stored in the broadcast segment schedule 112. In an alternate embodiment, in addition to determining the broadcast channel and time using the indication of selection, the segment sponsor module 106 uses a vector or vectors to determine the location of the indicated item in the screen 302 of the end device 118a-n at the time of selection of the item. A corresponding segment ID 204a-n may thus denote the location and time of selection of an item at the end device 118a-n.

At step 406, the segment sponsor module 106 identifies an item ID using the identified broadcast segment and the broadcast segment schedule 112.

At step 408, the segment sponsor module 106 identifies a corresponding sponsor of the item. The corresponding sponsor is one of the sponsors 120a-n in the system 100 connected to the server 102. The segment sponsor module 106 uses the broadcast segment schedule 112 in order to identify the corresponding sponsor ID 208a-n of the indicated item in the segment 204a-n. The broadcast segment schedule 112 lists the corresponding sponsor ID 208a-n for each segment 204a-n and each of the item IDs 206a-n. If the item is sponsored by multiple sponsors, the segment ID 204a-n may correspond to multiple of the sponsor IDs 208a-n. A particular segment ID 204a-n may have multiple corresponding sponsor IDs 208a-n.

At step 410, the messaging module 104 assigns an anonymous temporary address to the indication of selection of the item. The anonymous temporary address may be stored in the end user account 114. The anonymous temporary address is configured so that a reply from the corresponding sponsor returns to the server 102. For instance, the anonymous temporary address may be a temporary email address assigned by the server 102. The messaging module also prepares a request for information based on the indication of selection of the item. The request for information excludes identifying information regarding the end user.

At step 412, the input/output module 108 sends the request for information based on the indication of selection of the item to the corresponding sponsor. The request for information includes an item ID that allows the sponsor to understand the context of the request for information. The input/output module 108 may send the request for information to multiple sponsors depending on the configuration of the segment IDs 204a-n and the corresponding sponsor IDs 208a-n.

Figure 4:
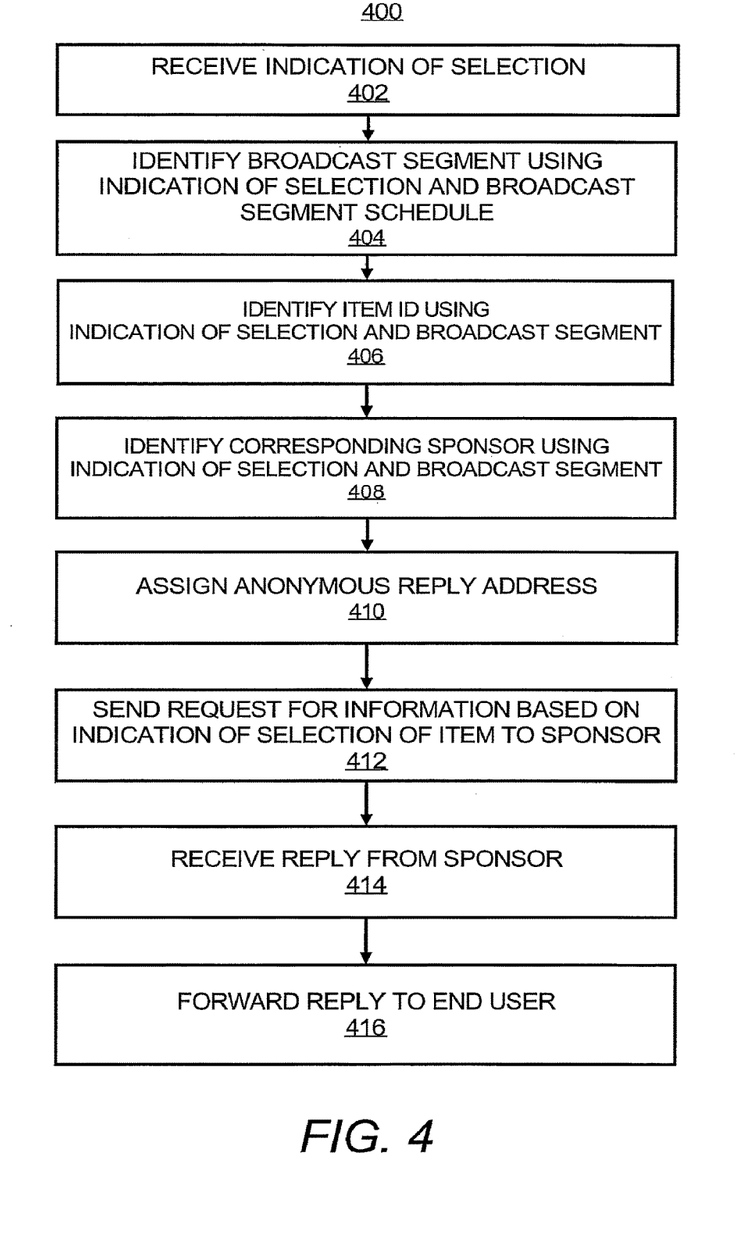
FIG. 4 shows flow diagram of a method of using a system to provide sponsored content to an end device, according to an embodiment of the invention.
Figure 5:
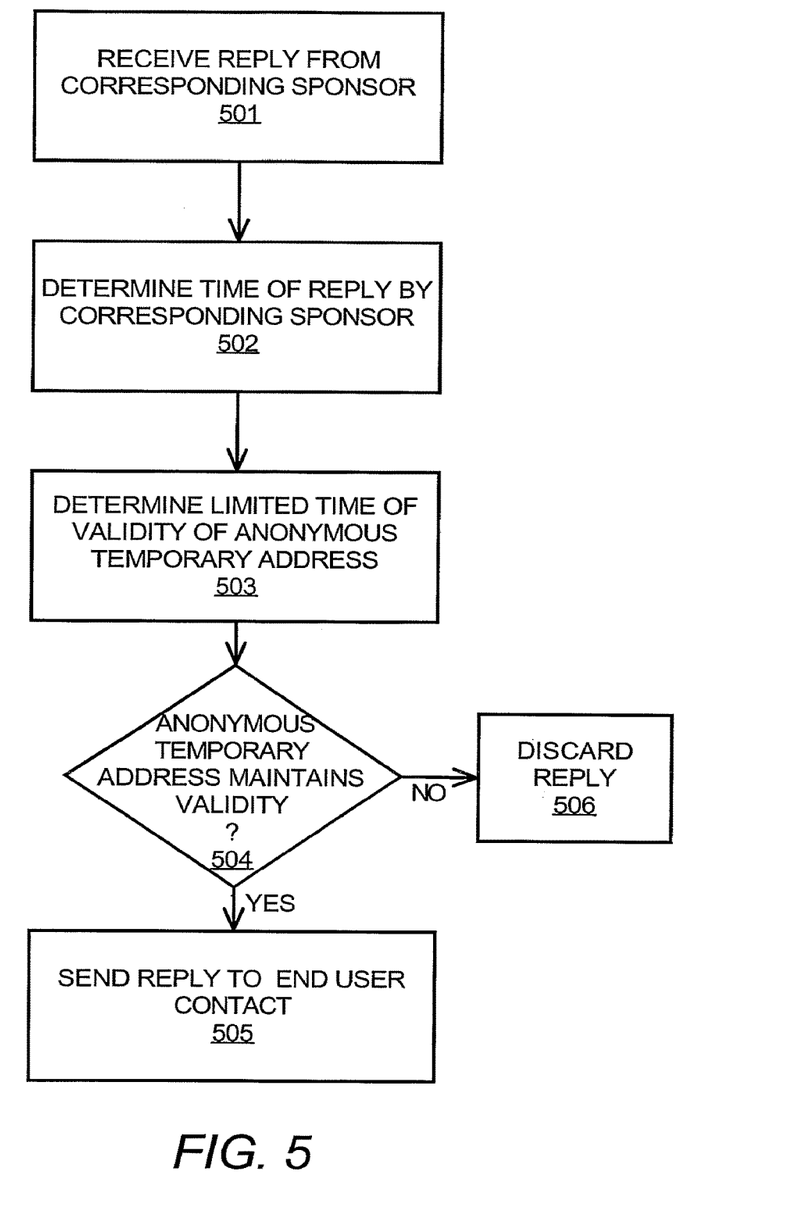
FIG. 5 shows flow diagram of a method of using a system to receive a reply from a sponsor, according to an embodiment of the invention.

At step 414, the input/output module 108 receives a reply from the corresponding sponsor and prepares the reply for forwarding as detailed in method 500 with respect to FIG. 5.

At step 416, the input/output module 108 then forwards the reply from the corresponding sponsor to the end user contact specified in the end user account 114a-n. The end user may initiate further contact with the corresponding sponsor if the end user so desires.

With reference now to FIG. 5, there is shown a method of receiving a reply from the corresponding sponsor and preparing the reply for forwarding to the end user contact. At step 501, the input/output module 108 receives a reply from the corresponding sponsor. The input/output module 108 may thereafter transfer the reply to the messaging module 104.

At step 502, the messaging module 104 determines a time of reply by the corresponding sponsor. The messaging module 104 may receive the time of reply of the corresponding sponsor at the time the reply is transferred from the input/output module 108.

At step 503, the messaging module 104 determines the limited time of validity of the anonymous temporary address. The limited time of validity may be stored in the end user account 114 with the anonymous temporary address. The messaging module 104 may retrieve the limited time of validity from the end user account 114.

At step 504, the messaging module 104 determines whether the anonymous temporary address maintains validity for reply to the end user. According to an embodiment the messaging module 104 determines whether the time of reply by the corresponding sponsor is less than or equal to the limited time of validity. At step 505, if the time of reply by the corresponding sponsor is less than or equal to the limited time of validity of the anonymous temporary address (for instance, the reply is received after a deadline), the messaging module 104 sends the reply from the corresponding sponsor to the input/output module 108. However, if the time of reply by the corresponding sponsor is greater than the limited time of validity of the anonymous temporary address, at step 506, the messaging module 104 discards the reply from the corresponding sponsor.

Additionally, at step 504, when determining whether the anonymous temporary address maintains validity for reply to the end user, the messaging module 104 may determine whether with a present reply by the corresponding sponsor the total number of replies by the corresponding sponsor remains within an allowed limit. The messaging module 104 may send the reply to the input/output module 108 if the number of replies by the corresponding sponsor is within the allowed limit at step 505. Thereafter, the messaging module 104 may prepare the reply for forwarding by transferring the end user contact to the input/output module 108. The input/output module 108 then forwards the reply. Alternately, at step 506, the messaging module 104 may discard the reply if the number of replies by the corresponding sponsor is greater than the allowed limit.

Figure 6:
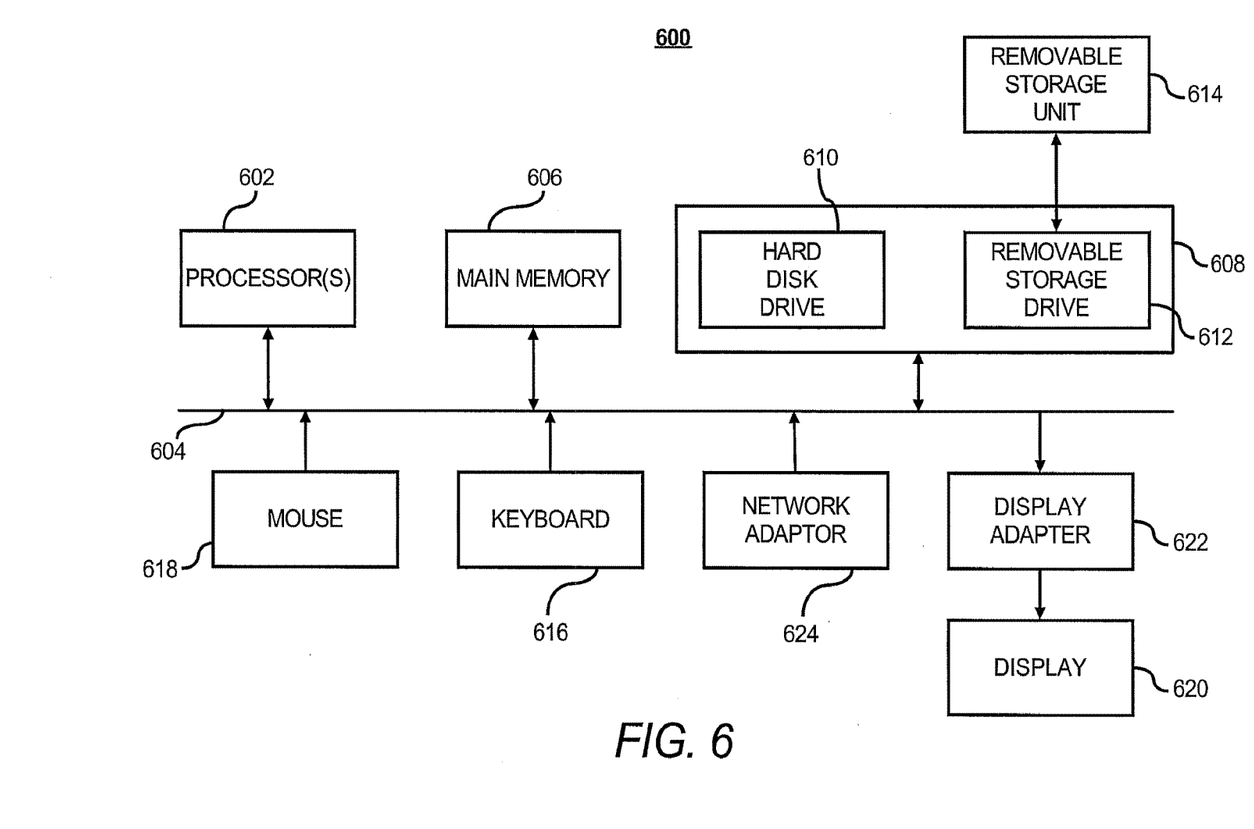
FIG. 6 shows a block diagram of a computer system configured to implement or execute one or more of the processes depicted in FIG. 3, according to an embodiment of the invention.

FIG. 6 illustrates a block diagram of a computing apparatus 600 configured to implement or execute one or more of the processes depicted in FIGS. 4-5, according to an embodiment. It should be understood that the illustration of the computing apparatus 600 is a generalized illustration and that the computing apparatus 600 may include additional components and that some of the components described may be removed and/or modified without departing from a scope of the computing apparatus 600.

The computing apparatus 600 includes a processor 602 that may implement or execute some or all of the steps described in the method depicted in FIGS. 4-5. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for one or more of the processes depicted in FIGS. 4-5 may be stored.

The removable storage drive 610 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

The embodiments enable an end user to quickly and easily obtain information from a sponsor by selecting a a broadcast segment in a broadcasted program. For instance, the embodiments may enable an end user to receive a recipe and/or coupons from a cooking show by pressing a button on a remote control at an appropriate point in the show (as opposed to writing down and visiting a uniform resource locator (URL) at a later time). In addition, the access is anonymous and protected, relieving privacy concerns the end user may have.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method for providing sponsored content to an end device, the method comprising:
    identifying, by a computer system, a sponsor of a broadcast segment that was being presented at a time of an interaction, at an end device, with an item presented within the broadcast segment;
    generating, by the computer system, an anonymized message that includes an item ID corresponding to the item that received the interaction at the end device, a temporary user address that conceals an identity of an end user of the end device, and has a specified validity period, wherein the specified validity period indicates an amount of time the temporary user address is a valid address for communicating with the end user about the item that received the interaction;
    receiving, by the computer system and from the sponsor, additional information about the item;
    determining, by the computer system, whether the validity period for the anonymized message is still valid or has expired when the reply is received from the sponsor; and
    in response to determining the reply is received after the validity period of the anonymized message has expired, discarding, by the computing system, the reply.

2. The method of claim 1, further comprising in response to determining the reply is received before the validity period of the anonymized message has expired, forwarding, by the computer system, the reply to the end device when the reply.

3. The method of claim 2, wherein generating an anonymized message comprises generating an anonymized message that includes the item ID and an anonymous temporary address of the end user.

4. The method of claim 3, wherein the anonymous temporary address of the end user conceals an identify of the end user from the sponsor of the reply.

5. The method of claim 4, wherein identifying a sponsor of the broadcast segment comprises identifying the sponsor based at least in part on the location of the item in the broadcast segment.

6. The method of claim 2, wherein forwarding the reply to the end device comprises forwarding the reply to an anonymous address corresponding to an end user.

7. The method of claim 6, wherein determining that the reply from the sponsor is valid is further based on a total number of replies received from the sponsor within a given time period.

8. A system, comprising:
    a data storage device storing a broadcast segment schedule; and
    one or more computers that interact with the data storage device and execute instructions that cause the one or more computers to perform operations comprising:
        identifying, by a computer system, a sponsor of a broadcast segment that was being presented at a time of an interaction, at an end device, with an item presented within the broadcast segment;
        generating, by the computer system, an anonymized message that includes an item ID corresponding to the item that received the interaction at the end device, a temporary user address that conceals an identity of an end user of the end device, and has a specified validity period, wherein the specified validity period indicates an amount of time the temporary user address is a valid address for communicating with the end user about the item that received the interaction;
    receiving, by the computer system and from the sponsor, additional information about the item;
    determining, by the computer system, whether the validity period for the anonymized message is still valid or has expired when the reply is received from the sponsor; and
    in response to determining the reply is received after the validity period of the anonymized message has expired, discarding, by the computing system, the reply.

9. The method of claim 8, further comprising in response to determining the reply is received before the validity period of the anonymized message has expired, forwarding, by the computer system, the reply to the end device when the reply.

10. The method of claim 9, wherein generating an anonymized message comprises generating an anonymized message that includes the item ID and an anonymous temporary address of the end user.

11. The method of claim 10, wherein the anonymous temporary address of the end user conceals an identify of the end user from the sponsor of the reply.

12. The method of claim 11, wherein identifying a sponsor of the broadcast segment comprises identifying the sponsor based at least in part on the location of the item in the broadcast segment.

13. The method of claim 9, wherein forwarding the reply to the end device comprises forwarding the reply to an anonymous address corresponding to an end user.

14. The method of claim 13, wherein determining that the reply from the sponsor is valid is further based on a total number of replies received from the sponsor within a given time period.

15. A non-transitory computer readable medium storing instructions that upon execution by one or more computers cause the one or more computers to perform operations comprising:

identifying, by a computer system, a sponsor of a broadcast segment that was being presented at a time of an interaction, at an end device, with an item presented within the broadcast segment;

generating, by the computer system, an anonymized message that includes an item ID corresponding to the item that received the interaction at the end device, a temporary user address that conceals an identity of an end user of the end device, and has a specified validity period, wherein the specified validity period indicates an amount of time the temporary user address is a valid address for communicating with the end user about the item that received the interaction;

receiving, by the computer system and from the sponsor, additional information about the item;

determining, by the computer system, whether the validity period for the anonymized message is still valid or has expired when the reply is received from the sponsor; and in response to determining the reply is received after the validity period of the anonymized message has expired, discarding, by the computing system, the reply.

\* \* \* \* \*